Figure 3:
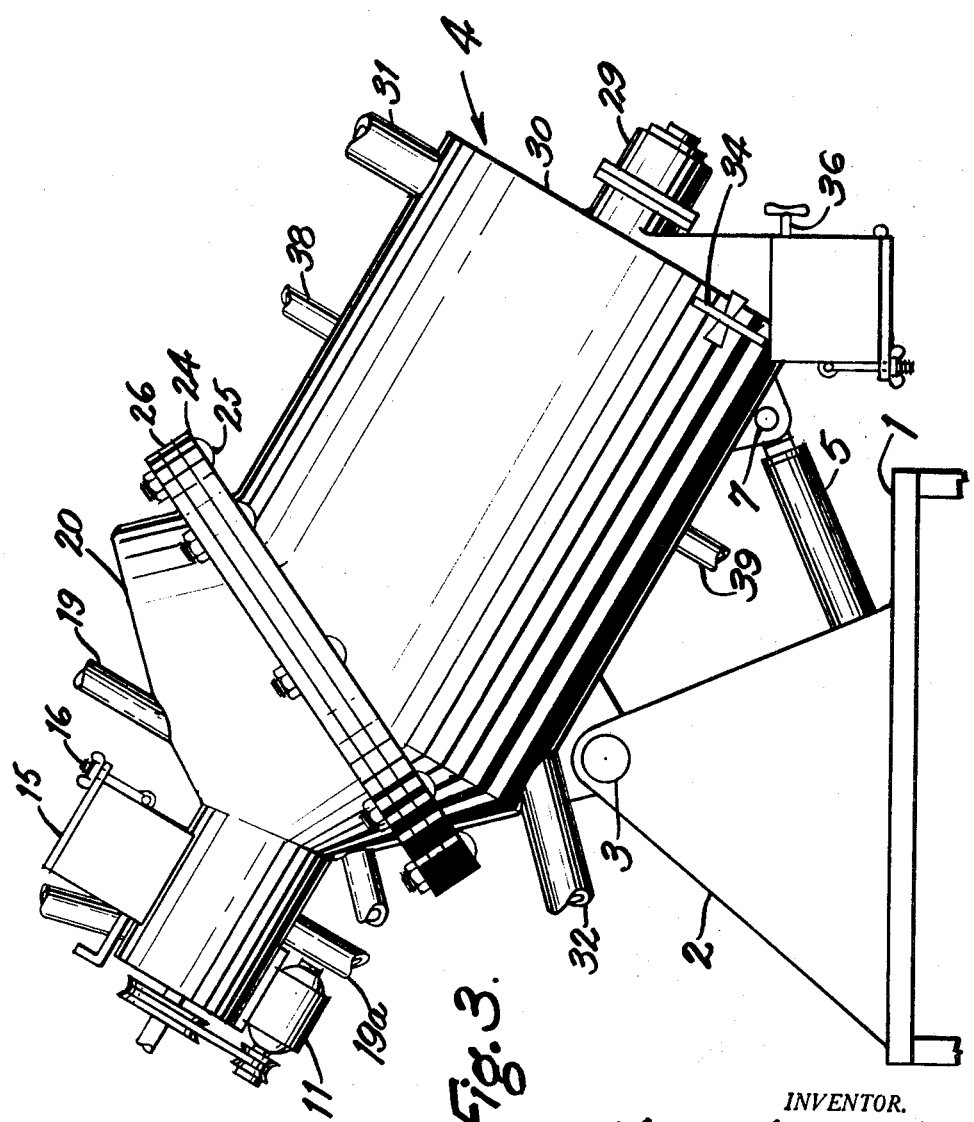

Sept. 3, 1968 W. L. MORRISON 3,399,998
METHOD OF RETAINING VOLATILE ESSENCES IN COFFEE DURING ROASTING
Filed Jan. 7, 1964 2 Sheets-Sheet 1
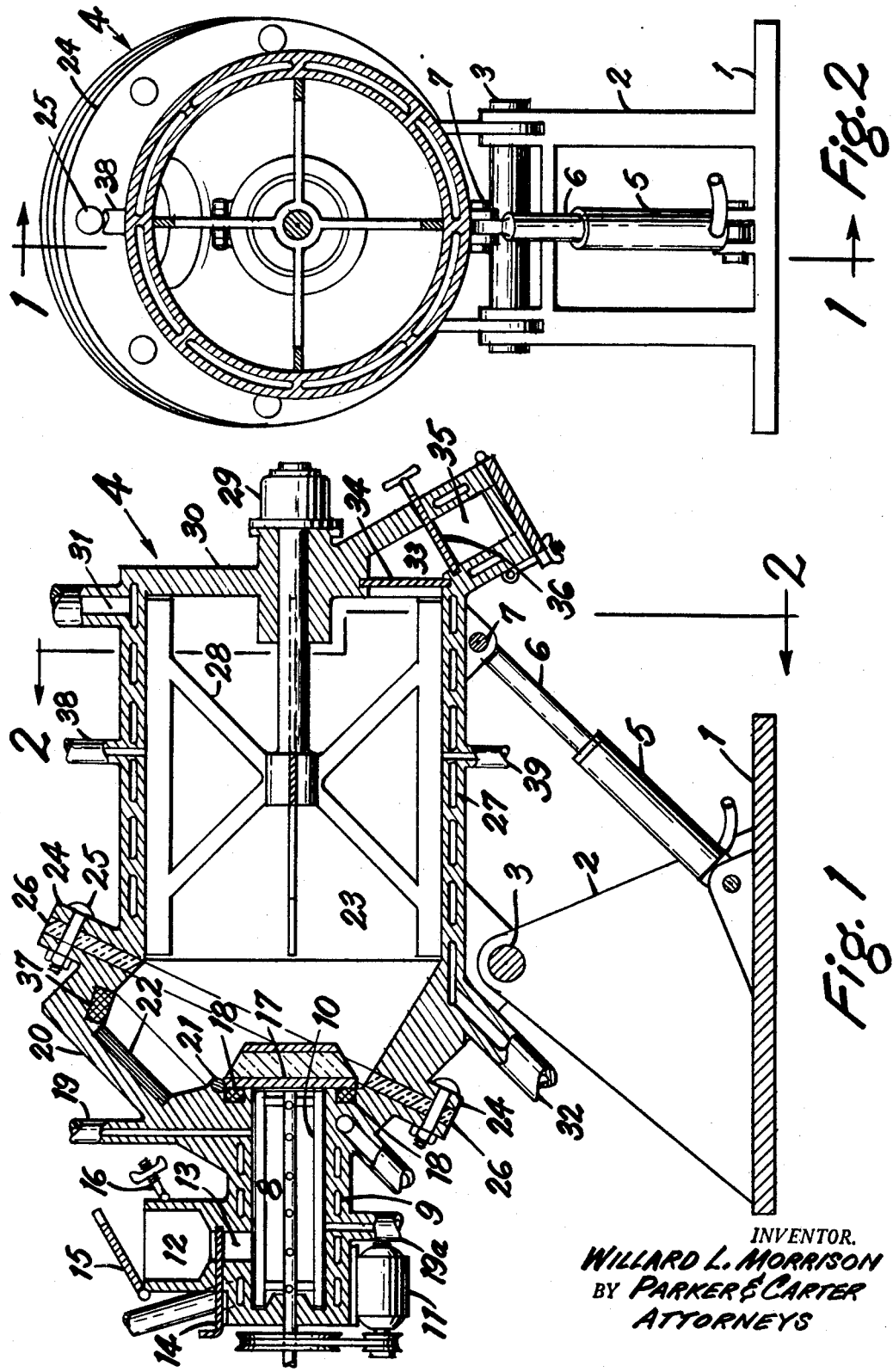
INVENTOR.
WILLARD L. MORRISON
BY PARKER & CARTER
ATTORNEYS Sept. 3, 1968          W. L. MORRISON          3,399,998

METHOD OF RETAINING VOLATILE ESSENCES IN COFFEE DURING ROASTING

Filed Jan. 7, 1964          2 Sheets-Sheet 2

INVENTOR.
WILLARD L. MORRISON
BY PARKER&CARTER
ATTORNEYS

United States Patent Office 3,399,998
Patented Sept. 3, 1968

3,399,998
METHOD OF RETAINING VOLATILE ESSENCES
IN COFFEE DURING ROASTING
Willard L. Morrison, Lake Forest, Ill., assignor to The
Union Stock Yard and Transit Company of Chicago,
Chicago, Ill., a corporation of Illinois
Continuation-in-part of application Ser. No. 23,095,
Apr. 18, 1960. This application Jan. 7, 1964, Ser.
No. 336,153
4 Claims. (Cl. 99—68)

This is a continuation-in-part of my copending application Ser. No. 23,095, filed Apr. 18, 1960, and entitled, "Method of Retaining Volatile Essences in Foodstuffs During Treatment," and now abandoned.

My invention, while primarily directed to the treatment of raw coffee beans, is equally well adapted for treatment of other aromatic beans and the like. I propose as a substitute for the successive independent roasting and grinding steps a process treatment wherein the bean is first roatsed while the aromatics are conserved, is then expanded or popped as a substitute for grinding and the conserved aromatics are given back to the bean so that the bean may thereafter, if desired, be used for making coffee without subsequent grinding.

In general, I propose to take the raw coffee bean, place it in an autoclave, draw a vacuum therein to eliminate the air and break the vacuum by replacing the air with gaseous nitrogen. The autoclave will then be heated to roast the coffee and build up a pressure in the autoclave. The aromatics will as a result of the roasting be driven with the moisture out of the bean but will with the nitrogen be trapped in the autoclave.

After the beans have been roasted and a sufficient pressure has been built up in the autoclave as a result of the roasting heat, a door will be suddenly opened and the beans will be shot into an associated retort wherein the pressure is sufficiently below that of the autoclave to insure the well known popping or expanding action. The pressure in the larger chamber will normally be below atmospheric at the time popping occurs though under some circumstances it will be atmospheric and the pressure in the roasting oven will, of course, be far above atmospheric. This autoclave which may or may not contain a nitrogen atmosphere will be maintained at a temperature below the dew point of the essences extracted from the coffee bean. As a result the moisture expelled from the bean as it pops, including the essences, will tend to be deposited on the walls of the retort and the coffee beans will be agitated and churned about in contact with the walls of the retort until the popped beans have had to pick up and recover such essences. The beans after such pick up will be discharged from the retort and packed in cans, preferably in a nitrogen atmosphere, preferably at or below atmospheric pressure.

The popped bean is, as a result of its popping, porous. Hence it readily absorbs the moisture and aroma from the walls of the chamber. Also without grinding the bean may well be used to brew coffee because of its great porosity and permeability to liquid.

The retort into which the hot beans are explosively shot or projected will, previous to such projection, preferably be filled with a nitrogenous atmosphere in contrast with an air atmosphere. This may be done by drawing a vacuum and breaking it with nitrogen. It is not essential, of course, to have in either the autoclave or the retort a pure nitrogen atmosphere but air will be replaced by nitrogen to the point that only a residual amount of oxygen is present to contact the coffee bean in the various stages of roasting, puffing, recovery of essences and packing.

My invention is illustrated diagrammatically in the accompanying drawings, wherein—

FIG. 1 is a diagrammatic longitudinal section through a popping gun;
FIG. 2 is a section along the line 2-2 of FIG. 1; and
FIG. 3 is a side elevation of the gun in discharge position.

Like parts are indicated by like numerals throughout the specification and drawings.

A fixed base 1 carries upwardly extending brackets 2 on which is trunnioned at 3 a popping gun assembly 4. The popping gun assembly is overbalanced, the weight being on the right hand side of the trunnion 3. A cylinder 5 pivoted on the base 1 carries a plunger 6 pivoted at 7 on the popping gun 4 so that the gun may be in working position as indicated in FIG. 1 or in discharge position as indicated in FIG. 3.

The gun itself includes an insulated roasting autoclave or popping chamber or oven 8 which may be heated by steam coils 9. It contains a stirring paddle 10 driven by a motor 11. The paddle is mounted on a hollow shaft through which steam may be discharged to assist in the popping action if desired. The feed hopper 12 communicates with the chamber 8 through the passage 13 controlled by a valve 14. The lid 15 on the popper may be locked closed by the screw and nut 16.

The chamber 8 is closed at its discharge end by the insulated flapper valve 17, seated by electro-magnet 18. The duct 19 through which—after the oven is charged with coffee beans from the feed hopper 12—nitrogen if desired may be introduced to escape through the duct 19a and displaced most if not all of the air in the roasting chamber. A generally conical hood 20 extends forwardly to surround and encircle the insulated flapper valve 17. The flapper valve is hinged at 21 and when held seated under pressure by the electro-magnet 18 seals the chamber 8. When the current is broken to release the electromagnet, pressure in chamber 8 violently unseats the valve 17, rotates it upwardly against the cushion pad 22 to permit pressure to shoot the contents of the oven 8 out into the popping chamber 23. The popping chamber is cylindrical as indicated, flanged at 24, bolted at 25 to the hood 20, insulation 26 being interposed between them. The wall of the popping cylinder is cooled by a cooling jacket 27 so that when the grains are blown out and popped in the chamber 23 they are caught and the vapors bursting from the beans are cooled by the cool walls of the chamber 23. Since the cool walls are below the dew point, moisture is deposited on those walls. 28 is a paddle driven by the motor 29 in the closed head 30 of the chamber 23 to agitate and churn the popper grains, bringing them into contact with the moisture laden walls so that the porous expanded grain may pick up the moisture with its charge of aromatic materials from the walls of the chamber. The thermostatically controlled refrigerating solution which may be water or other suitable fluid enters the cooling coils 27 through duct 31, leaves through duct 32 though any desired method of cooling may be used.

At the right hand end of the chamber 23 is the discharge port 33 controlled by a manually operated valve 34 leading into a tunnel 35 in which will be placed a can to receive the popped coffee. The tunnel is divided into two sections above and below the manually operated valve 36. With valve 36 closed and valve 34 open, the popper will be rotated into the discharge position shown in FIG. 3 and the port area above the valve 36 will be filled with popped coffee beans by gravity. Then valve 34 will be closed, valve 36 open and the measured quantity between the valves 36 and 34 will be discharged by gravity into the can, thus filling it. The filled can may be replaced by another and this process will continue until the entire charge has been measured out, can by can.

The particular details of can filling, measuring and the like form no part of the present invention and are not specifically illustrated.

If desired, the pad 22 may include a holding magnet 37 which will hold the door open so as to give ample time for the discharge of the hot beans from the oven 8.

38, 39 include ducts passing through the chamber 23 through which, if desired, nitrogen may be introduced and air discharged to decrease the oxygen content of the chamber 23.

Under some circumstances it will be desirable to raise the pressure in the roasting chamber 8 above that which would result merely from the rise in temperature. This can be done by continuing to supply nitrogen or air through the duct 19, closing off the discharge duct.

The use and operation of the invention are as follows:

The green coffee bean is fed into a small autoclave at atmospheric pressure. If desired, nitrogen is introduced to expel most, if not all, of the air and the autoclave is then tightly closed. The temperature is raised to the point adequate to properly roast the bean. That point, depending on the type of roast desired and the character of the bean, is the temperature conforming to the roasting temperature if the bean were to be roasted in the usual manner.

For coffee beans, the temperature may be raised to within the range of 400–700° F. for a time within the range of 20–40 minutes and preferably a temperature within the range of 500–600° F. for about 30 minutes for roasting the coffee beans. The pressure would be raised to an amount within the range of 50–350 pounds per square inch and preferably about 75–150 pounds per square inch.

When the desired temperature has been reached and roasting completed, the discharge door is released and the contents of the autoclave are violently discharged into the low pressure recovery zone. Thus the bean which has been roasted is now popped or expanded and is no longer the hard dense small bean but a large expanded porous bean similar in texture to other expanded grains like wheat, rice and the like.

The temperature in the recovery zone is maintained below the dew point and preferably below 100° F. so the moisture in the bean when it explodes or pops permeates the atmosphere in the recovery zone, which atmosphere may be oxygen or air as the case may be. Because the walls of the recovery zone are below the dew point the moisture containing as it does much of the aromatic elements is deposited, being concentrated on the wall, going there because of the well known characteristic that vapor migrates from the warm to the cool surfaces. This condensed liquid coating the wall is then picked up by the porous beans as they are agitated in the recovery zone and brought into contact with the moistened surfaces. It is the concentration of the liquid as a result of this vapor migration to the below dew point surface which makes it possible for the bean to pick up the moisture and the aromatics which it lost as a result of roasting and popping.

After the beans have been agitated a sufficient length of time in the recovery zone, the beans are withdrawn and packaged in the usual manner.

I claim:

1. The method of treating green coffee beans which consists of the steps of enclosing the green beans in a closed roasting container, sealing the container, raising the temperature within the container to a roasting temperature within the range of 400–700° F. without bleeding off vapors generated within the container, retaining the beans within the container until roasted with a resultant increase in pressure in the container to within the range of 50–350 pounds per square inch, opening the container and discharging the pressurized contents thereof directly into a low pressure sealed recovery container of larger capacity than the roasting container with resultant popping of the roasted beans to produce a porous bean with the escape of moisture vapors therefrom, maintaining the recovery container at a temperature below 100° F. with corresponding condensation of released vapors, churning the contents thereof to bring the popped porous beans into contact with the boundaries of the container until the popped porous beans have absorbed the moisture and vapors condensed on the boundaries, and then opening the recovery container and removing and packing the popped porous coffee beans.

2. The method of treating green coffee beans which consists of the steps of enclosing the beans in a closed roasting container, sealing the container, raising the temperature within the container to a roasting temperature within the range of 500–600° F. without bleeding off vapors generated within the container, retaining the beans within the container until roasted with a resultant increase in pressure in the container to within the range of 75–150 pounds per square inch, opening the container and discharging the pressurized contents thereof directly into a low pressure sealed recovery container of larger capacity than the roasting container with resultant popping of the roasted beans to produce a porous bean with the escape of moisture vapors therefrom, maintaining the recovery container at a temperature below 100° F. with corresponding condensation of released vapors, churning the contents thereof to bring the popped porous beans into contact with the boundaries of the container until the popped porous beans have absorbed the moisture and vapors condensed on the boundaries, and then opening the recovery container and removing and packing the popped porous coffee beans.

3. The method of treating green coffee beans which consists of the steps of enclosing the green beans in a roasting zone, sealing the roasting zone with the beans therein, drawing a vacuum on the roasting zone for the removal of air, introducing nitrogen into the roasting zone for replacement of air removed therefrom, raising the temperature in the zone to a roasting temperature within the range of 400–700° F. and retaining the beans in the roasting zone until roasted with resultant increase in pressure in the zone to within the range of 50–300 pounds per square inch without the release of moisture and vapors from the roasting zone, opening the zone for discharge of the pressurized contents directly into a low pressure recovery zone of much larger capacity than the roasting zone with resultant popping of the beans to produce a porous roasted bean and with the release of moisture and vapors therefrom, maintaining the boundaries of the recovery zone at a temperature below 100° F. for the condensation of vapors on the boundaries, agitating and churning the content material within the recovery zone to bring the popped porous beans into contact with the boundaries for absorption of moisture and vapors into the porous beans, opening the recovery zone and removing and packing the popped beans.

4. The method as claimed in claim 3 which includes the additional steps of drawing a vacuum on the recovery zone prior to the discharge of the content material from the roasting zone into the recovery zone, and introducing nitrogen into the recovery zone for replacement of removed air.

References Cited

UNITED STATES PATENTS

| | | | |
|---|---|---|---|
| 2,278,473 | 4/1942 | Musher | 99—65 |
| 255,965 | 4/1882 | Fleury et al. | 99—68 X |
| 2,444,217 | 6/1948 | Arementrout | 99—68 |
| 3,223,021 | 12/1965 | Osswald | 99—68 X |

FOREIGN PATENTS

| | | |
|---|---|---|
| 3,129 | 1901 | Great Britain. |

MAURICE W. GREENSTEIN, *Primary Examiner.*